Nov. 7, 1939.  F. S. SCHADE  2,178,812
NURSING TRAY
Filed Sept. 29, 1938  2 Sheets-Sheet 1
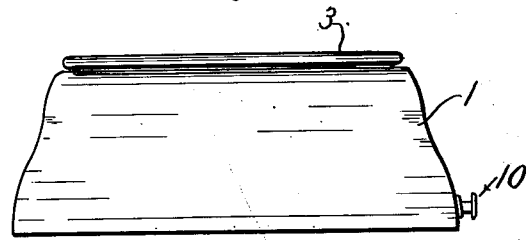
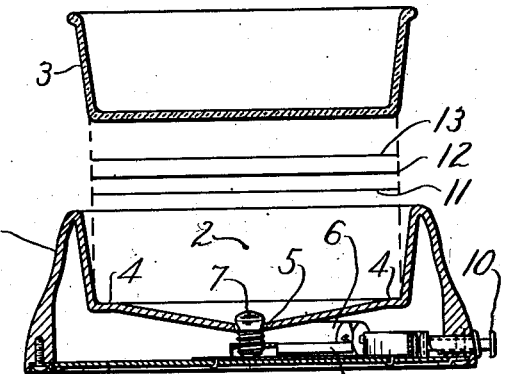
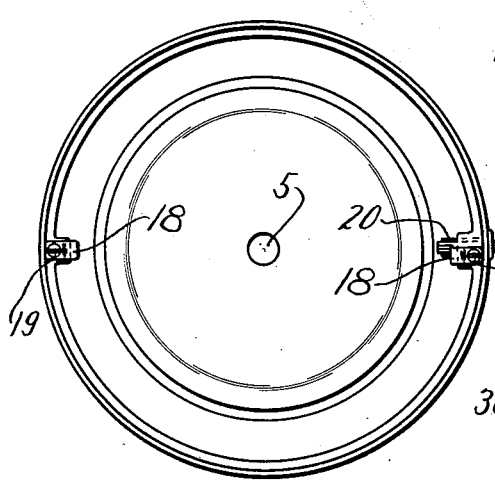
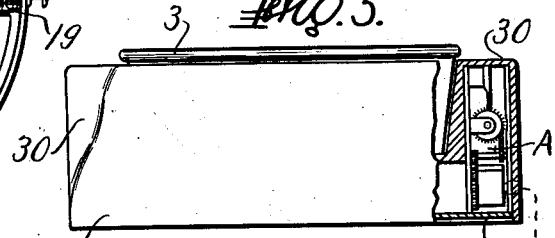
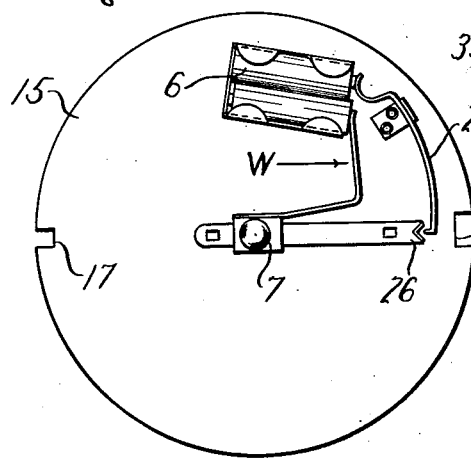
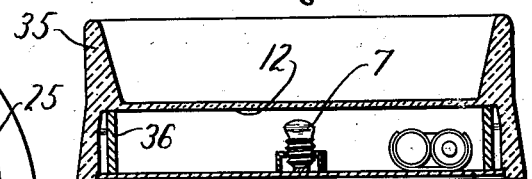
INVENTOR
FRANK STANLEY SCHADE
BY
Chapin + Neal
ATTORNEYS Nov. 7, 1939.  F. S. SCHADE  2,178,812
NURSING TRAY
Filed Sept. 29, 1938   2 Sheets-Sheet 2
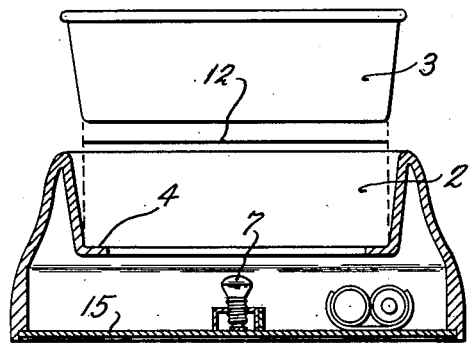
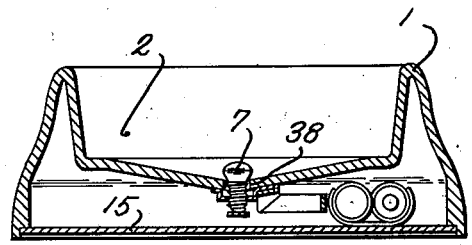
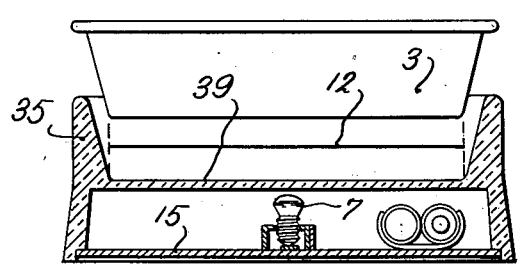
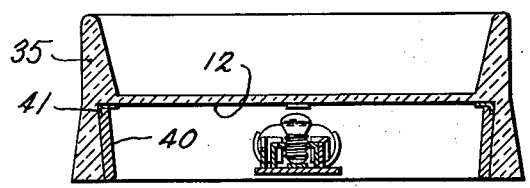
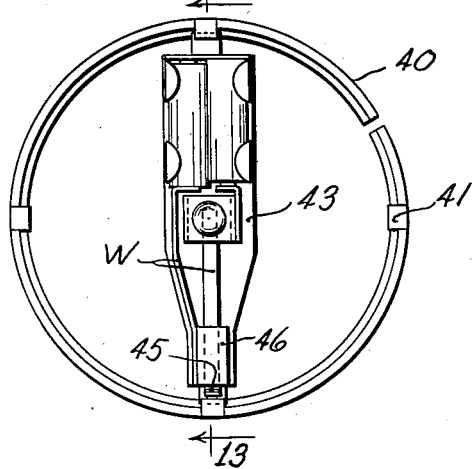
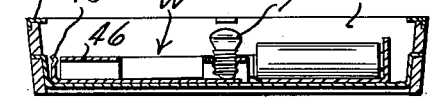
INVENTOR
FRANK STANLEY SCHADE
BY
Chapin+Neal
ATTORNEYS Patented Nov. 7, 1939

2,178,812

UNITED STATES PATENT OFFICE 2,178,812

NURSING TRAY

Frank Stanley Schade, Holyoke, Mass.

Application September 29, 1938, Serial No. 232,370

5 Claims. (Cl. 40—130)

This invention relates to a nursing tray for use with a dish as an aid in feeding children, and is an improvement over the structure shown in my Patent No. 2,118,900, dated May 31, 1938.

The present device contains many specific improvements in construction and association of the various elements which themselves are a minimum in number, with a resulting decreased cost of manufacture and increased facility of use. Other advantages and features of the invention will appear when the specification is taken in connection with the drawings, in which—

Fig. 1 is an elevation of the tray and dish;

Fig. 2 is a sectional composite view of the tray and dish of Fig. 1;

Fig. 3 is a bottom view of the tray with the base closure member, on which certain parts are mounted, removed;

Fig. 4 is a top plan view of the base closure member;

Figs. 5 and 6 are modified forms of trays;

Fig. 7 is a detail view of an electrical switch member used with the various forms of trays;

Figs. 8 and 9 are modifications of the form of tray shown in Figs. 1 and 2;

Figs. 10 and 11 show alternate structures for a tray similar to that shown in Fig. 6;

Fig. 12 is a top plan view of the closure member used with the tray of Fig. 11; and Fig. 13 is a section on line 13—13 of Fig. 12.

In the preferred form shown in Figs. 1 and 2, the tray 1 is shaped to appear generally like a bowl with a broad base. As is shown in the sectional view, this tray 1 has a recess 2 shaped to receive the bowl 3. The bottom of this recess 2 extends horizontally a short distance from the sides of the opening forming a shelf 4 and then drops away at a small angle to the center where an opening 5 is provided.

The base of tray 1 is hollow and provides a convenient receptacle for dry batteries 6 which are connected by the wiring W to a small flashlight bulb 7. The bulb 7 extends through the opening 5 and is energized by manual operation of the switch 10 extending through the side wall of the base of tray 1. The switch 10, as will be explained in detail at another point, is constructed to provide for either intermittent or continuous energization of bulb 7.

When the tray is being used as an aid in feeding, a sheet of tissue paper 11 is placed on the shelf 4 and a picture 12, such as that cut out of the children's section of the newspaper, is laid on top of the tissue paper. Then an additional sheet of tissue paper 13 is placed on top of the picture 12 and the bowl 3 placed in position.

As the child is being fed, the picture 12 is made to appear and disappear by manipulation of the switch 10, thereby riveting the child's attention and acting as an aid in coaxing the child to consume the contents of the bowl. This function has been fully discussed in my issued patent above referred to, and further explanation is not, therefore, deemed necessary.

In the above explanation, the positions of the tissue sheets 11 and 13 were referred to as being above and below the picture 12. The function of these sheets 11 and 13 is to disperse the light from the bulb 7 so that the picture does not have an objectionably bright spot at any point. For this purpose, it is therefore to be understood that any suitable material other than tissue may be used and the number or position of the sheets varied to suit the type of picture 7. The particular arrangement of sheets described is used merely by way of example.

As will be noticed, no separate reflector or separate supporting glass screen and picture frame are necessary as with my previous construction, all because these parts or their equivalents are provided for by integral structure. For example, the reflector is the upper surface of the wall surrounding lamp 7. This elimination of separate parts is also carried out by the provision of shelf 4 which acts as a support for the marginal edges of the picture 12 when the bowl is placed in position, and thus provision is made for the picture frame. The weight of the bowl and the slight stiffness of the sheets 11 and 13 and picture 12 combine to hold the elements against the surface of the shelf 4, with the result that the picture 12 overlies the light 7 and is removably held in position against the bottom of dish 3 to give most satisfactory results.

Referring now to Figs. 3 and 4, the batteries 6, wiring W, and bulb 7 are all carried by a disk-like member 15 which acts as a closure for the hollow base of tray 1. Member 15 is preferably of insulating material such as fiber, pasteboard, ply-board, or other material so that the wiring W may be bare. This member 15 has notches 16 and 17 which, when the tray is in use, fit under lugs 18 secured to the base of tray 1 by screws 19. With this construction it is a simple matter to remove the electrical system as a unit by simply removing the member 15, as for instance to install new batteries or when it is desired to wash the tray 1.

Referring now to Figs. 2, 3, and 7, the switch 10 consists of two concentric tubular members 20 and 21. The outer member 20 is fitted through the wall of tray 1 and ends flush with the outside surface of the tray. The inner member 21 is longer than member 20 and extends outwardly beyond the surface of the tray 1. Member 21 has a notch cut in its under surface at its inner end with a tongue 22 depending into a slot cut in member 20. Tongue 22 is pressed against the bottom of the slot cut in member 20 by the spring pressure of wire 25 of the electrical system. As is plain, energization of bulb 7 is accomplished by pressing the member 21 which causes wire 25 to contact wire 26 and close the electrical circuit. If a constant light is desired, plunger 21 is pushed in and given a twist which causes tongue 22 to ride on the inner edge of member 20 so that the wires 25 and 26 are held in contact when the finger pressure on plunger 21 is released. In this way provision is made for varying the light under the picture 12 without attracting the child's attention unduly.

As indicated in the drawings, various modifications of my structure are possible and I will now explain these.

In Fig. 5 the tray 1 is provided with ears 30, the construction being otherwise the same. Within one ear 30 is inserted a miniature music box mechanism indicated by reference character A. As is indicated, the music box mechanism is supported from the bottom by closure member 15 and this provides not only a means to keep the mechanism in place but also a suitable sounding board for the mechanism which is of such proportions as to be hardly audible when closure member 15 is removed from association with it. A hole is provided at 33 for insertion of a key for winding the mechanism when that operation is necessary.

The provision of this mechanism in addition to the lighted picture allows for variety in the means available to coax the child in forming desired eating habits, by holding attention on the dish with the food in it.

In Fig. 6 is shown a slightly different construction wherein the tray 35 is cast out of translucent material in one piece and itself forms the bowl; that is, the bowl and the tray or "holder" are integral. As before, the base of the tray 35 is hollow and contains the batteries and bulb secured to the closure member 15. In this case, in addition, an annulus 36 is secured to 15 or conveniently placed in supported relation thereon and in turn supports the picture 12 against the under side of the bottom of the bowl portion of tray 35. Light from the bulb 7 shines through the picture 12 and the latter appears on the bottom of the translucent dish. In the form shown, the entire dish is cast as one piece, but it is of course understood that any type of material can be used for the tray as long as a translucent bottom in the bowl is provided.

In Fig 8 the construction resembles that indicated in section in Fig. 2 but the recess 2 has no concavity in the center, the bottom of the recess being formed with the shelf 4 defining the boundary of a circular opening communicating with the hollow base. In this case the picture 12 is laid directly on the shelf 4 and the bowl 3 placed thereon, usually without the interposition of any tissue sheets because by locating the bulb 7 in the base on the closure member 15 and not surrounding it with any reflector surface, a soft, diffused light shines through the picture giving the desired effect. This structure is particularly useful where the picture is made of exceedingly thin material.

In Fig. 9 the tray 1 is constructed with the flashlight bulb 7 extending down through the opening 38 in the bottom of the recess 2, the socket for supporting the bulb 7 being attached to the under side of the concave base of the recess 2. While this form does not present the unitary association of the electrical parts that is possible with a structure like that of Fig. 2 where all said electrical parts are mounted on the closure member 15, it permits easy access to the bulb 7 without removal of the closure member 15. This feature is desirable where the tray is used without the bowl to amuse the child by merely shining the light through the cut-out picture, for in such cases the child in his excitement may drop a hard object such as his spoon or rattle into the recess 2, fracturing the bulb and necessitating replacement.

Fig. 10 shows how the structure of Fig. 6 may be used as a tray for a bowl. In this case the annulus 36 of Fig. 6 is omitted and the picture 12 held between the bowl 3 and the bottom 39 of the upper recess. As is evident from the drawings, the electrical system is carried as a unit by the closure member 15

Figs. 11 and 12 show another variation of the construction of Fig. 6 which in addition to being extremely economical to make is considerably easier to disassemble, for instance to clean the bowl or change the picture. As in Fig. 6, the bowl 35 is made entirely of translucent material, or at least has a translucent base in the upper recess. However, the bulb and batteries as well as the picture 12 are supported solely by the annulus 40.

Referring to Figs. 11 and 12, the annulus 40 consists of a split ring which is slightly larger in diameter than the opening of the base of the bowl 35 and which springs into tight contact therewith when it is inserted. The picture 12 is supported against the bottom of the top recess by tongues 41 carried on the upper edge of the annulus 40. The bulb and batteries are suitably mounted on the member 43 which spans the annulus 40 and is secured to the side walls thereof.

As is indicated in Figs. 12 and 13, contact is established between the strap 45 and U-shaped abutment 46 of the wiring W to energize the electrical system and light the bulb 7. The most appealing feature of this type of tray is its extreme simplicity and economical structure.

Having disclosed my invention, what I claim is:

1. A nursing tray for a dish comprising a base portion having a hollowed-out space extending down from the top surface of said base portion, said space being shaped to support a dish centrally of the opening, a recess formed in the bottom of said base portion and adjacent said space, an opening communicating between the bottom of said space and said recess and forming a shelf in the bottom of said hollowed-out space, said shelf being bounded by the sides of said opening and the walls of the hollowed-out space, a closure member for said recess with an electric lamp, batteries, and wiring mounted thereon, and a switch to control the energization of said lamp whereby a transparent picture may lie with its marginal portions supported on the shelf and its body extending across the opening, and a translucent dish may be placed in the hollowed-out space to rest on the shelf over said picture.

2. A nursing tray for a dish comprising a base portion having a hollowed-out space extending down from the top surface of said base portion, said space being shaped to support a dish centrally of the opening, a depression in the base of said hollowed-out space, forming a shelf between the outer edges of said depression and the side walls of said hollowed-out space, a recess formed in the bottom of said base portion and adjacent said space, an opening communicating between the depression and said recess, an electric lamp mounted in said base portion with its base extending through the opening and its opposite end lying in said depression, a closure member for said recess with batteries and wiring mounted thereon and in electrical connection with said lamp and a switch to control the energization of said lamp whereby a transparent picture may lie with its marginal portions supported on the shelf and its body extending across the depression and a translucent dish may be placed in the hollowed-out space to rest on the shelf over said picture.

3. A nursing tray for a single dish comprising a base portion having a hollowed-out space extending down from the top surface of said base portion, said space being shaped to support a dish centrally of the opening, a depression in the base of said hollowed-out space with an opening in said depression and a shelf between the outer circumference of said depression and the side walls of said hollowed-out space, a recess in the bottom of said base portion adjacent said first mentioned space and communicating with said space by means of said opening, a closure member for said recess with an electric lamp, batteries, and wiring mounted thereon with the lamp extending through the opening in said depression, and a switch to control the energization of said lamp, whereby a transparent picture may lie with its marginal portions supported on the shelf and its body extending across the depression and a translucent dish may be placed in the hollowed-out space to rest on the shelf over said picture.

4. A nursing tray combination comprising a base portion with an opening in its upper surface to accommodate a dish, an aperture in the bottom of said opening connecting said opening with a recess in the bottom of said base portion, a translucent picture to lie on the bottom of said opening over said aperture, a closure member for said recess, a lamp, batteries and wiring supported by said closure member with the lamp protruding through said aperture and underlying the picture and a translucent bowl to fit said opening and overlie the picture.

5. A nursing tray combination comprising, a base portion with an opening in its upper surface to accommodate a dish, a shelf in the bottom of said opening, an aperture adjacent said shelf in position to underlie a translucent picture supported by said shelf and connecting said opening with a recess in the bottom of said base portion, a translucent picture to lie on said shelf over said aperture, a lamp aligned with said aperture and underlying the picture, a closure member for said recess, batteries and wiring supported by said closure member, and a translucent bowl to fit said opening and overlie the picture.

FRANK STANLEY SCHADE.